US008908656B2

(12) United States Patent
Sadek et al.

(10) Patent No.: US 8,908,656 B2
(45) Date of Patent: Dec. 9, 2014

(54) SUPPORT FOR MULTI-RADIO COEXISTENCE DURING CONNECTION SETUP

(75) Inventors: Ahmed K. Sadek, San Diego, CA (US); Ashok Mantravadi, San Diego, CA (US); Jibing Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 122 days.

(21) Appl. No.: 13/346,490

(22) Filed: Jan. 9, 2012

(65) Prior Publication Data

US 2013/0010766 A1 Jan. 10, 2013

Related U.S. Application Data

(60) Provisional application No. 61/431,427, filed on Jan. 10, 2011, provisional application No. 61/434,827, filed on Jan. 20, 2011, provisional application No. 61/442,609, filed on Feb. 14, 2011.

(51) Int. Cl.
| | |
|---|---|
| *H04B 15/00* | (2006.01) |
| *H04B 7/00* | (2006.01) |
| *H04W 72/04* | (2009.01) |
| *H04J 3/00* | (2006.01) |
| *H04W 72/12* | (2009.01) |
| *H04W 24/10* | (2009.01) |
| *H04W 88/06* | (2009.01) |

(52) U.S. Cl.
CPC .......... *H04W 72/1215* (2013.01); *H04W 24/10* (2013.01); *H04W 88/06* (2013.01)
USPC ......... 370/336; 455/63.1; 370/252; 455/41.2; 455/501

(58) Field of Classification Search
CPC ... H04B 15/00; H04W 72/1215; H04W 88/06
USPC .......................... 370/336, 337; 455/63.1, 41.2
See application file for complete search history.

(56) References Cited

U.S. PATENT DOCUMENTS

| | | | |
|---|---|---|---|
| 7,649,869 B2 | 1/2010 | Mittal et al. | |
| 8,346,171 B1 * | 1/2013 | Mack | 455/63.1 |

(Continued)

FOREIGN PATENT DOCUMENTS

| | | |
|---|---|---|
| JP | 2011512104 A | 4/2011 |
| WO | 2004045092 A1 | 5/2004 |

(Continued)

OTHER PUBLICATIONS

Samsung: "R2-105572: Possible TDM Solution for LTE, WiFi and BT In-device Coexistence." 3GPP TSG-RAN WG2 #71bis [Online] Oct. 11-15, 2010. See pp. 2-4.

(Continued)

*Primary Examiner* — Un C Cho
*Assistant Examiner* — Fangyan Deng
(74) *Attorney, Agent, or Firm* — Seyfarth Shaw LLP

(57) ABSTRACT

In a user equipment (UE) with multiple radio access technologies (RATs), communications of one RAT engaged in connection setup may be protected from communications of other RATs. Techniques for protecting such connection setups include performing power backoff on a potentially interfering RAT or implementing a time division multiplexing (TDM) solution alternating when certain RATs are active.

48 Claims, 15 Drawing Sheets

(56) References Cited

U.S. PATENT DOCUMENTS

| | | | |
|---|---|---|---|
| 8,351,456 | B2 | 1/2013 | Kadous et al. |
| 2006/0039450 | A1* | 2/2006 | Fulton et al. ............... 375/133 |
| 2008/0189970 | A1* | 8/2008 | Wang et al. ................. 33/701 |
| 2008/0205365 | A1 | 8/2008 | Russell et al. |
| 2008/0227488 | A1 | 9/2008 | Zhu et al. |
| 2009/0129367 | A1 | 5/2009 | Bitran |
| 2009/0257379 | A1* | 10/2009 | Robinson et al. ............ 370/329 |
| 2010/0061326 | A1 | 3/2010 | Lee et al. |
| 2010/0172254 | A1* | 7/2010 | Sachs ........................ 370/252 |
| 2010/0197235 | A1* | 8/2010 | Wilhelmsson ............... 455/63.3 |
| 2010/0197316 | A1* | 8/2010 | Aoyama et al. ............ 455/452.1 |
| 2010/0202429 | A1 | 8/2010 | Chin et al. |
| 2010/0246463 | A1* | 9/2010 | Papasakellariou et al. ... 370/311 |
| 2010/0322287 | A1 | 12/2010 | Truong et al. |
| 2011/0009136 | A1 | 1/2011 | Mantravadi et al. |
| 2011/0243047 | A1 | 10/2011 | Dayal et al. |
| 2011/0268048 | A1 | 11/2011 | Toskala et al. |
| 2012/0040715 | A1* | 2/2012 | Fu et al. ..................... 455/553.1 |
| 2012/0164948 | A1 | 6/2012 | Narasimha et al. |
| 2012/0188907 | A1 | 7/2012 | Dayal et al. |
| 2012/0213116 | A1 | 8/2012 | Koo et al. |
| 2013/0021983 | A1 | 1/2013 | Sadek et al. |
| 2013/0242780 | A1 | 9/2013 | Dayal et al. |

FOREIGN PATENT DOCUMENTS

| | | |
|---|---|---|
| WO | 2009137295 A2 | 11/2009 |
| WO | 2011002795 A1 | 1/2011 |
| WO | WO2011123531 | 10/2011 |

OTHER PUBLICATIONS

3rd Generation Partnership Project; Technical Specification Group Radio Access Networks; Evolved Universal Terrestrial Radio Access (E-UTRA); Study on signaling and procedure for interference avoidance for in-device coexistence; (Release 10), 3GPP Standard; 3GPP TR 36.816, 3rd Generation Partnership Project (3GPP), Mobile Competence Centre ; 650, Route Des Lucioles ; F-06921 Sophia-Antipolis Cedex ; France, No. v1.0.0, Dec. 17, 2010, pp. 1-34, XP050462125, [retrieved on Dec. 17, 2010].

Intel Corporation (UK) LTD: "General analysis of TDM solutions for coexistence", 3GPP Draft; R2-106583, 3rd Generation Partnership Project (3GPP), Mobile Competence Centre ; 650, Route Des Lucioles ; F-06921 Sophia-Anti Polis Cedex ; France, vol. RAN WG2, No. Jacksonville, USA; Nov. 15, 2010, Nov. 9, 2010, XP050492356, [retrieved on Nov. 9, 2010].

Intel Corporation (UK) LTD: "Timeline analysis of TDM solutions for coexistence with WiFi", 3GPP Draft; R2-106584, 3rd Generation Partnership Project (3GPP), Mobile Competence Centre ; 650, Route Des Lucioles ; F-06921 Sophia-Anti Polis Cedex ; France, vol. RAN WG2, No. Jacksonville, USA; Nov. 15, 2010, Nov. 9, 2010, XP050492357, [retrieved on Nov. 9, 2010].

International Search Report and Written Opinion—PCT/US2012/020762—ISAEPO—May 10, 2012.

Mediatek: "Analysis in Potential TDM Coexistence Solutions", 3GPP Draft; R2-105449 Potential TDM Solutions, 3rd Generation Partnership Project (3GPP), Mobile Competence Centre ; 650, Route Des Lucioles ; F-06921 Sophia-Antipolis Cedex ; France, vol. RAN WG2, No. Xi'an; Oct. 11, 2010, Oct. 5, 2010, XP050452605, [retrieved on Oct. 5, 2010].

Motorola: "Discussion on TDM approach for In-device coexistence", 3GPP Draft; R2-106476, 3rd Generation Partnership Project (3GPP), Mobile Competence Centre ; 650, Route Des Lucioles ; F-06921 Sophia-Antipolis Cedex ; France, vol. RAN WG2, No. Jacksonville, USA; Nov. 15, 2010, Nov. 9, 2010, XP050492293, [retrieved on Nov. 9, 2010].

3GPP: "3rd Generation Partnership Project; Technical Specification Group Radio Access Networks; Evolved Universal Terrestrial Radio Access (E-UTRA); Study on signaling and procedure for interference avoidance for in-device coexistence; (Release 10)", 3GPP Draft; R2-106971_TR36816_V100, 3rd Generation Partnership Project (3GPP), Mobile Competence Centre ; 650 Route Des Lucioles; F-06921 SOPHIA-ANTI POLTS CEDEX ; France vol. RAN WG2, No. Jacksonville, USA; Nov. 15, 2010, Dec. 1, 2010.

Intel Corporation (UK) LTD: "TDM Solutions for In-Device Coexistence", 3GPP Draft; R2-105666, 3rd Generation Partnership Project (3GPP), Mobile Competence Centre ; 650, Route Des Lucioles ; F-06921 SOPHIA-ANTIPOLIS CEDEX ; France, vol. RAN WG2, No. Xi 'an; Oct. 11, 2010, Oct. 5, 2010, XP050452677, [retrieved on Oct. 5, 2010] chapter 2, "TDM Solutions".

Intel Corporation (UK) LTD: "Time line analysis of TDM solutions for coexistence with Bluetooth", 3GPP Draft; R2-106585, 3rd Generation Partnership Project (3GPP), Mobile Competence Centre ; 650, Route Des Lucioles ; F-06921 SOPHIA-ANTIPOLIS CEDEX ; France, vol. RAN WG2, No. Jacksonville, USA; Nov. 15, 2010, Nov. 9, 2010, XP050492358, [retrieved on Nov. 9, 2010] chapter 3, "Results and Analysis" Annex C.

Intel: "General analysis of TDM solutions for coexistence", 3GPP Draft; R2-110229, 3rd Generation Partnership Project (3GPP), Mobile Competence Centre ; 650, Route Des Lucioles ; F-06921 SOPHIA-ANTIPOLIS CEDEX ; France, vol. RAN WG2, No. Dublin, Ireland; Jan. 17, 2011, Jan. 11, 2011, XP050492938, [retrieved on Jan. 11, 2011] chapter 3, "Reporting".

QUALCOMM: "Short term TDM solutions for LTE and Bluetooth voice coexistence", 3GPP Draft; R2-106006 Short Term TDM FORCX, 3rd Generation Partnership Project (3GPP), Mobile Competence Centre; 650, Route Des Lucioles ; F-06921 SOPHIA-ANTIPOLIS CEDEX ; France, vol. RAN WG2, No. Xia an, China; Oct. 2010, Oct. 15, 2010, XP050491851, [retrieved on Oct. 15, 2010] chapter 2, "LTE BT eSCO Timelines" chapter 3, "LTE-BT eSCO Time Sharing".

* cited by examiner

SUPPORT FOR MULTI-RADIO COEXISTENCE DURING CONNECTION SETUP

CROSS REFERENCE TO RELATED APPLICATION

This application claims the benefit of U.S. Provisional Patent Application No. 61/431,427 entitled "METHOD AND APPARATUS TO FACILITATE SUPPORT FOR MULTI-RADIO COEXISTENCE," filed Jan. 10, 2011, U.S. Provisional Patent Application No. 61/434,827 entitled "METHOD AND APPARATUS TO FACILITATE SUPPORT FOR MULTI-RADIO COEXISTENCE," filed Jan. 20, 2011, and U.S. Provisional Patent Application No. 61/442,609 entitled "METHOD AND APPARATUS TO FACILITATE SUPPORT FOR MULTI-RADIO COEXISTENCE," filed Feb. 14, 2011, the disclosures of which are expressly incorporated herein by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation.

With reference specifically to LTE, it is noted that a UE communicates with an evolved NodeB (eNodeB; e.g., a base station for a wireless communications network) to inform the eNodeB of interference seen by the UE on the downlink. Furthermore, the eNodeB may be able to estimate interference at the UE using a downlink error rate. In some instances, the eNodeB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNodeB. As a result, unilateral action on the part of the UE (e.g., moving the uplink signal to a different channel) may be thwarted by the eNodeB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNodeB. Hence, a ping-pong effect of being transferred back and forth between the corrupted channel and the desired channel can happen if the eNodeB uses RSRP reports to make handover decisions.

Other unilateral action on the part of the UE, such as simply stopping uplink communications without coordination of the eNodeB may cause power loop malfunctions at the eNodeB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

Offered is a method for wireless communications. The method includes allowing communications using a first radio access technology (RAT). The method also includes determining when communications of a second RAT may potentially interfere with connection setup(s) of the first RAT. The method further includes altering potentially interfering communications of the first RAT or second RAT to avoid interference with the connection setup(s) of the first RAT.

Offered is an apparatus for wireless communications. The apparatus includes means for allowing communications using a first radio access technology (RAT). The apparatus also includes means for determining when communications of a second RAT may potentially interfere with connection setup(s) of the first RAT. The apparatus further includes means for altering potentially interfering communications of the first RAT or second RAT to avoid interference with the connection setup(s) of the first RAT.

Offered is a computer program product for wireless communications. The computer program product includes a non-transitory computer-readable medium having program code recorded thereon. The program code includes program code to allow communications using a first radio access technology (RAT). The program code also includes program code to determine when communications of a second RAT may potentially interfere with connection setup(s) of the first RAT. The program code further includes program code to alter potentially interfering communications of the first RAT or second RAT to avoid interference with the connection setup(s) of the first RAT.

Offered is an apparatus for wireless communications. The apparatus includes a memory and a processor(s) coupled to the memory. The processor(s) is configured to allow communications using a first radio access technology (RAT). The processor(s) is also configured to determine when communications of a second RAT may potentially interfere with connection setup(s) of the first RAT. The processor(s) is also configured to alter potentially interfering communications of the first RAT or second RAT to avoid interference with the connection setup(s) of the first RAT.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
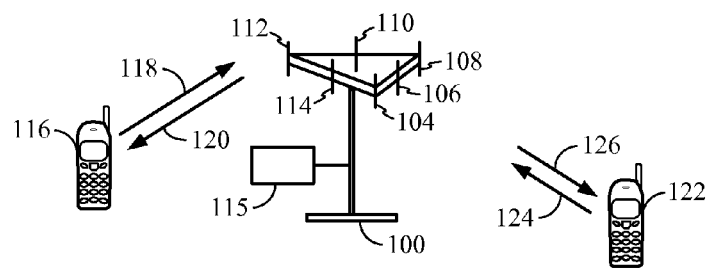
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNodeB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNodeB while reestablishing connection in the new channel or RAT. The eNodeB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNodeB) includes a computer 115 that has processing resources and memory resources to manage the LTE communications by allocating resources and parameters, granting/denying requests from user equipment, and/or the like. The eNodeB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNodeB. In this aspect, respective antenna groups are designed to communicate to UEs in a sector of the areas covered by the eNodeB 100.

In communication over the downlinks 120 and 126, the transmitting antennas of the eNodeB 100 utilize beamforming to improve the signal-to-noise ratio of the uplinks for the different UEs 116 and 122. Also, an eNodeB using beamforming to transmit to UEs scattered randomly through its coverage causes less interference to UEs in neighboring cells than a UE transmitting through a single antenna to all its UEs.

An eNodeB can be a fixed station used for communicating with the terminals and can also be referred to as an access point, base station, or some other terminology. A UE can also be called an access terminal, a wireless communication device, terminal, or some other terminology.

Figure 2:
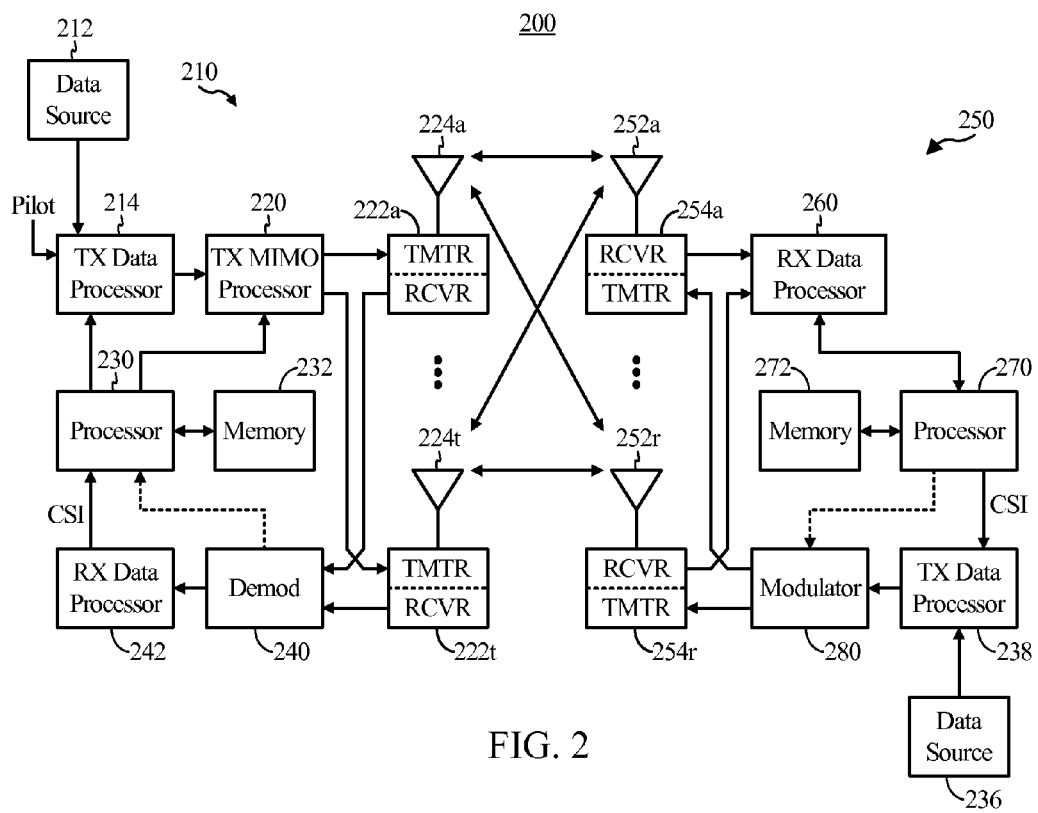
FIG. 2 is a block diagram of a communication system according to one aspect.

FIG. 2 is a block diagram of an aspect of a transmitter system 210 (also known as an eNodeB) and a receiver system 250 (also known as a UE) in a MIMO system 200. In some instances, both a UE and an eNodeB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNodeB to extract transmit beamforming gain on the downlink when multiple antennas are available at the eNodeB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
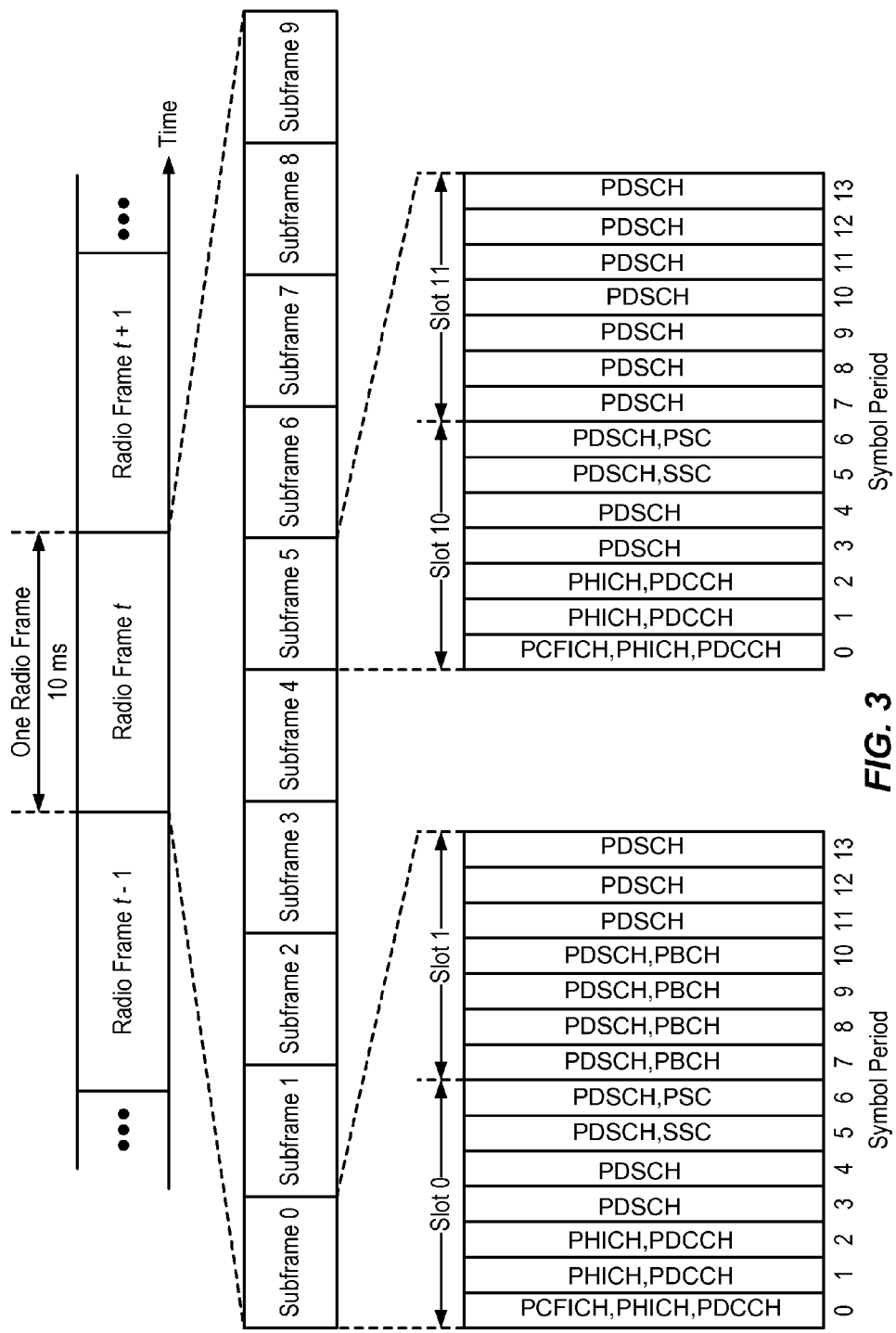
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a Primary Synchronization Signal (PSS) and a Secondary Synchronization Signal (SSS) for each cell in the eNodeB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Cell-specific Reference Signal (CRS) for each cell in the eNodeB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNodeB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

Figure 4:
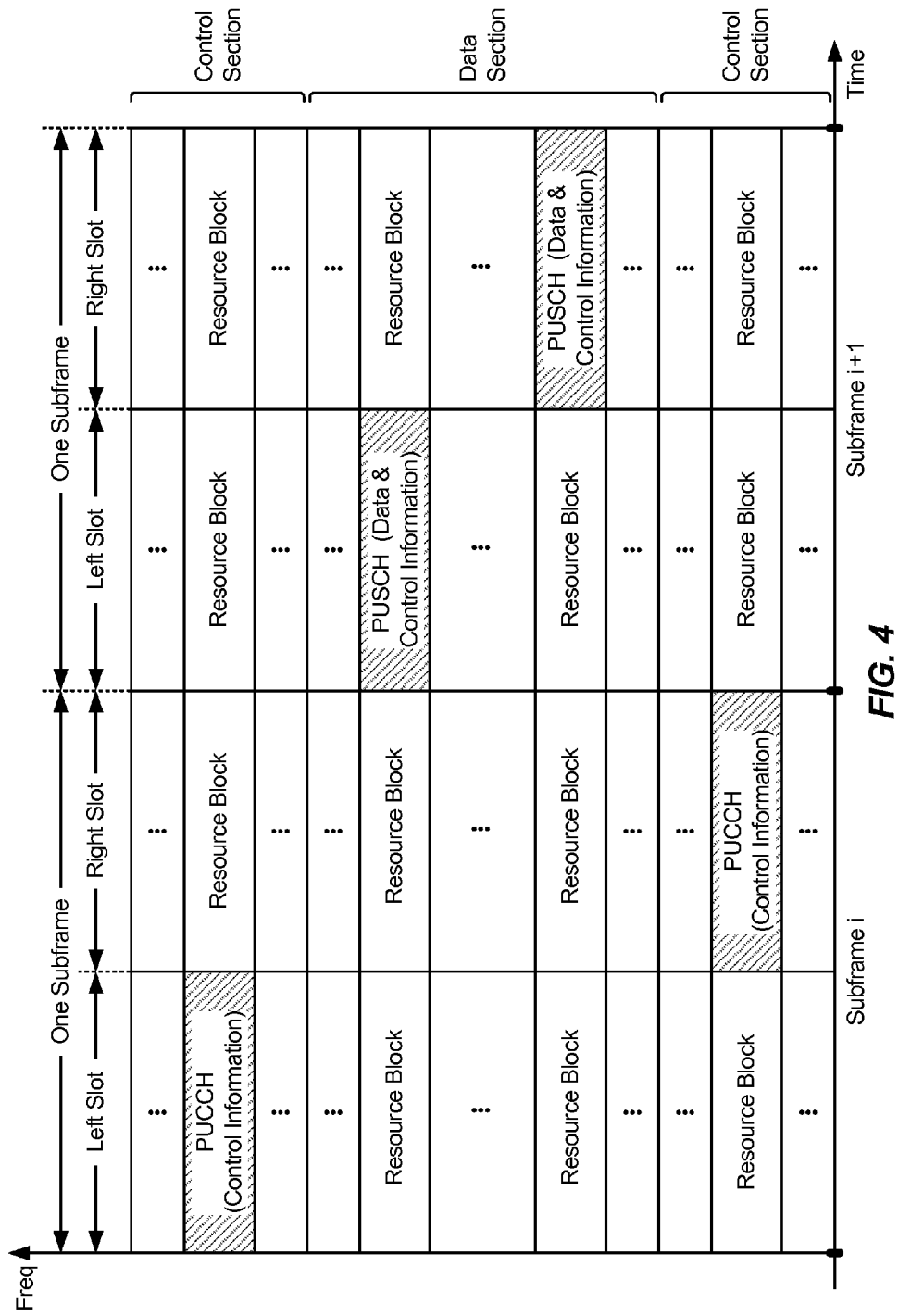
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
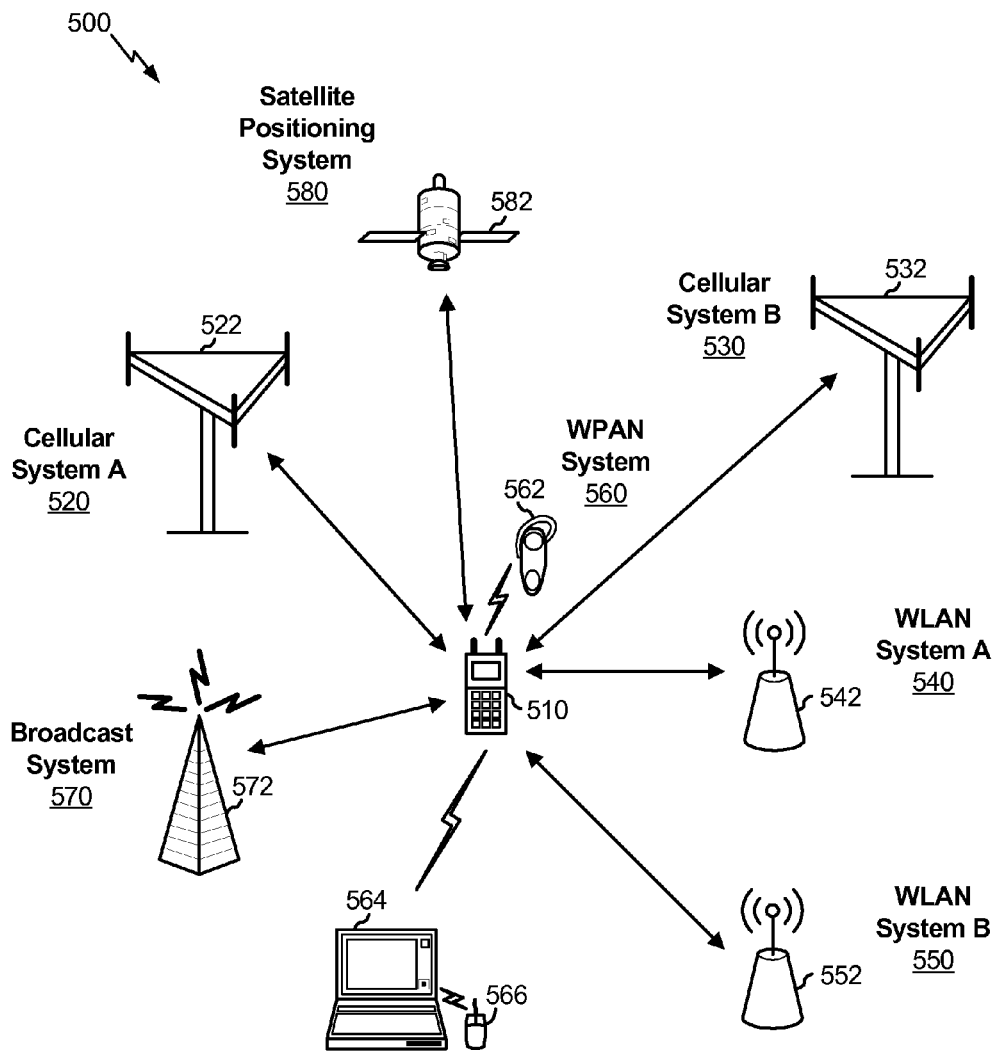
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™ Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices (s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
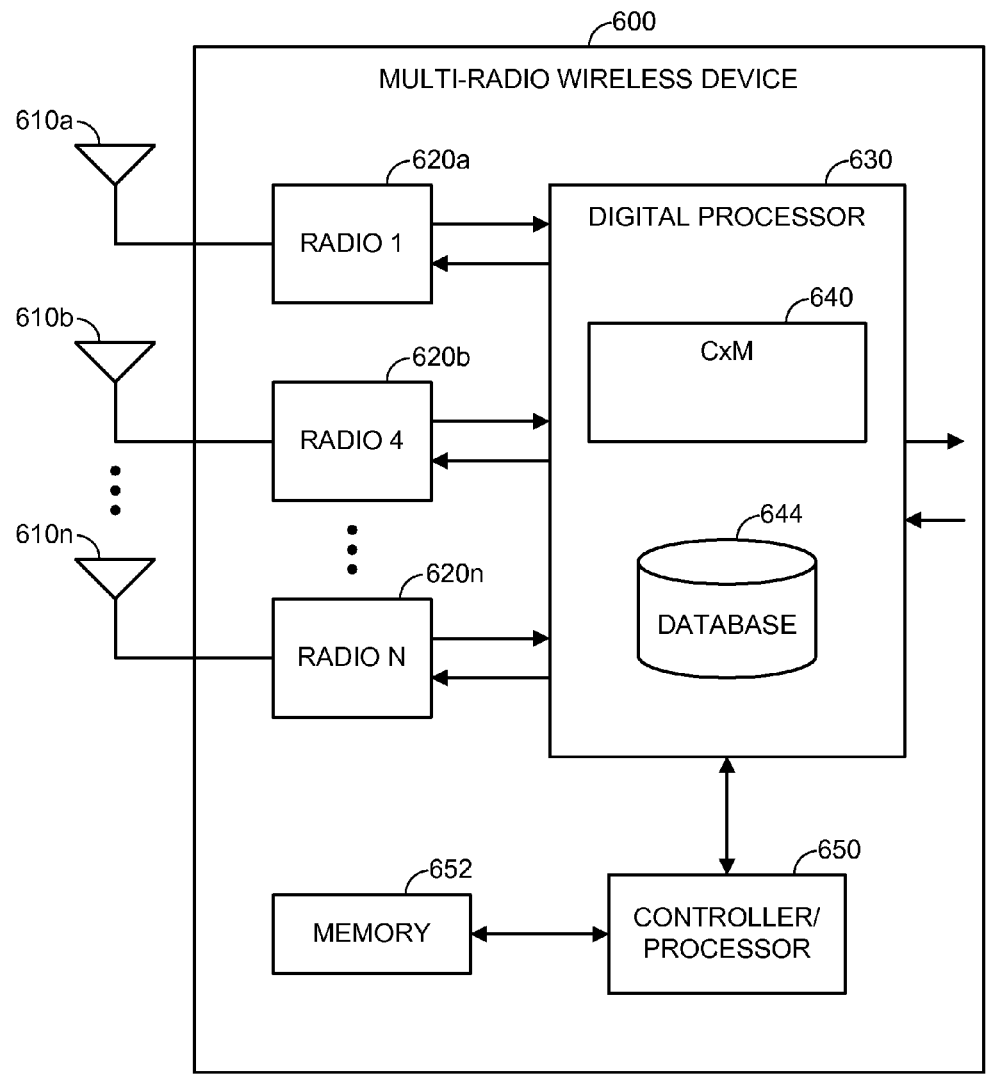
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
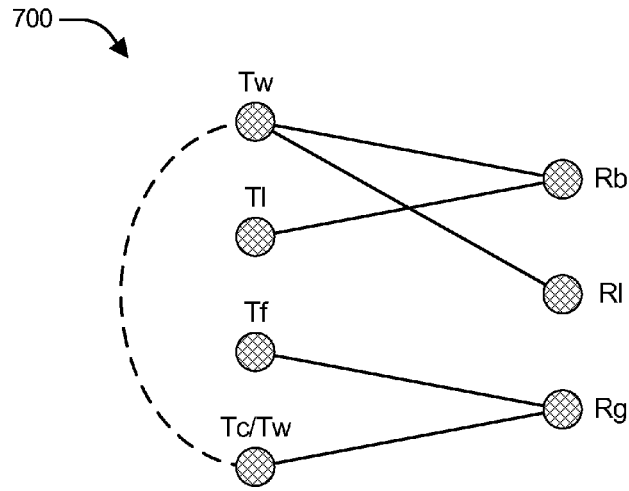
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
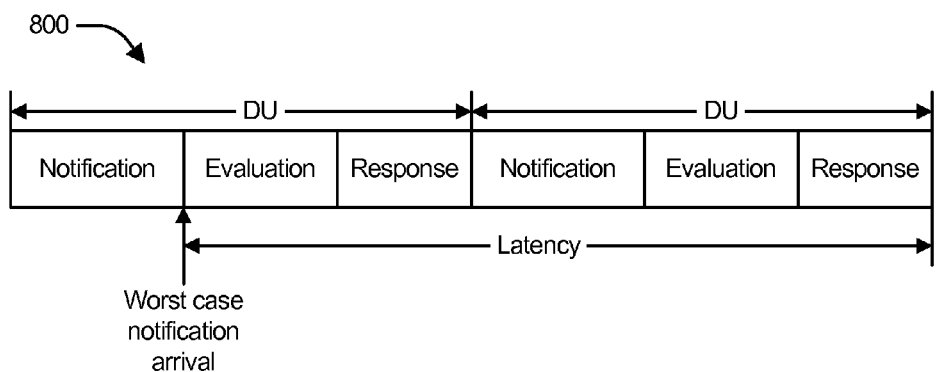
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 μs) where notifications are processed, and a response phase (e.g., 20 μs) where commands are provided to various radios 620 and/or operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
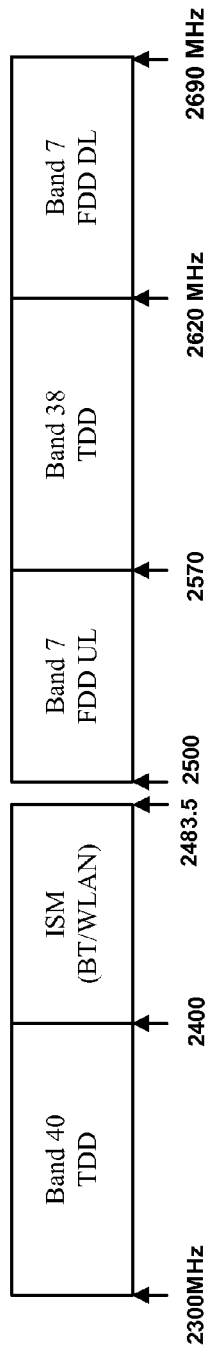
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNodeB can use to make interfrequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNodeB can in some cases handover the UE back to the problematic channel for load balancing purposes. In any case, it can be appreciated that existing techniques do not facilitate use of the bandwidth of the problematic channel in the most efficient way.

Figure 10:
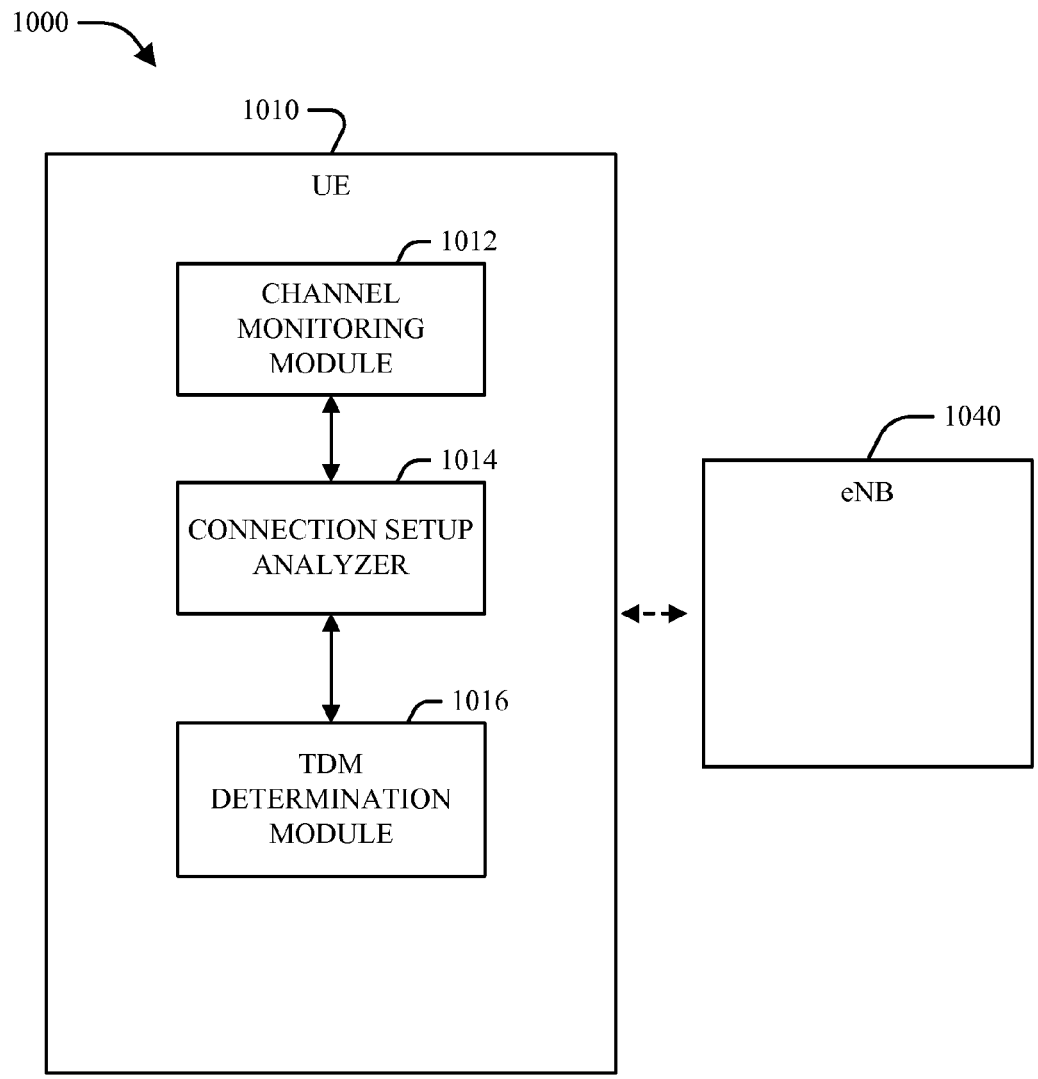
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNodeBs 1040, which can engage in uplink and/or downlink communications, and/or any other suitable communication with each other and/or any other entities in the system 1000. In one example, the UE 1010 and/or eNodeB 1040 can be operable to communicate using a variety resources, including frequency channels and sub-bands, some of which can potentially be colliding with other radio resources (e.g., a broadband radio such as an LTE modem). Thus, the UE 1010 can utilize various techniques for managing coexistence between multiple radios utilized by the UE 1010, as generally described herein.

To mitigate at least the above shortcomings, the UE 1010 may utilize respective features described herein and illustrated by the system 1000 to facilitate support for multi-radio coexistence within the UE 1010. The various modules including the channel monitoring module 1012, which monitors communication channels for potential coexistence issues, connection setup analyzer 1014, which determines when connection setups may occur and/or be exposed to interference from other radio resources, and time division multiplexing (TDM) determination module 1016, which determines when and which TDM schemes may be implemented to reduce interference to connection setups.

The coexistence interference issues between radios described above can be particularly troublesome during connection setup. Offered are a number of solutions to manage coexistence between radios during connection setup.

Support for Multi-Radio Coexistence During Connection Setup

A number of tasks and processes are run during Bluetooth connection setup. Some of these are high duty cycle (i.e., take a longer time to complete) and some are low duty cycle (i.e., shorter). In Band Class 7, for high duty cycle processes, proposed coexistence solutions include time division multiplexing (TDM) and power backoff. TDM solutions include creating a gap pattern in LTE communications to ensure proper Bluetooth operation. For short events, autonomous denial may be implemented. In autonomous denial, LTE resources (either transmit or receive) are denied, or LTE is transmitted with power backoff (i.e., transmitted with a power less than a certain threshold).

One high duty cycle process is Bluetooth paging (which can take up to 5.12 seconds). Paging may be user initiated and may occur a few times a day. To manage coexistence with a Bluetooth paging event, LTE power backoff may be employed. The power backoff may be accompanied by puncturing the Physical Uplink Control Channel (PUCCH), meaning the PUCCH is not transmitted in the half slot next to the ISM band. Specific methods for PUCCH puncturing are discussed in U.S. patent application Ser. No. 11/584,168 filed on Dec. 9, 2011, in the name of Banister et al., the disclosure of which is expressly incorporated herein by reference in its entirety.

In one aspect of the present disclosure, LTE power backoff with a paging event operates as follows. At the start of paging, a received signal strength indicator of Bluetooth while LTE is transmitting (RSSIb) is estimated. The a received signal strength indicator of Bluetooth while LTE is transmitting is estimated over each of 16 channels and averaged over a specific time, Tb, in milliseconds (ms). A sufficient number of samples are collected to obtain an accurate estimate. Next, the received signal strength indicator of Bluetooth when LTE is not transmitted (RSSIg) is estimated. If desired, LTE may be blanked (i.e., shutdown) for a certain period Tg to estimate RSSIg. Next, the expected value of the ratio of the estimates is calculated and compared with a specified threshold: $E_k[RSSIb(k)/RSSIg(k)] > \gamma$. If the expected value is larger than the threshold, LTE may be causing interference to Bluetooth, and power backoff may applied to LTE based on a radio frequency (RF) database. In one aspect, the maximum backoff is limited by the PUCCH power, such that the PUCCH power may be reduced up to a certain established point. Another configuration for assessing LTE power backoff calculates a number of Bluetooth channels where $RSSIb(k)/RSSIg(k)$ exceeds a threshold. If the number of those channels exceeds a threshold, then power backoff is applied to LTE.

Link Management Protocol (LMP) events follow paging events. For LMP events where Bluetooth is operating as a master, the same decision made during the paging stage would apply. For example, if a certain power backoff is applied during the paging stage, the same power backoff would apply during LMP events for the Bluetooth master. If no backoff is applied during the paging stage, no backoff would apply during the LMP stage for the Bluetooth master. For LMP events where Bluetooth is operating as a slave, Bluetooth is unable to assess power during the page scan and page response (around 250 ms) and thus, for example, is not able to calculate RSSIb or RSSIg. In this situation, power backoff and PUCCH puncturing may be allowed without an assessment.

Bluetooth inquiry events may occur for device pairing, detection, etc. For an inquiry event (which may take 10 seconds or more), the same process described above for paging may apply. In certain situations, inquiry will occur periodically rather than in response to user initiation. When inquiry is periodic, power backoff may only be applied for certain inquiry instances, for example, one of every N inquiries.

Other Bluetooth events, such as rare events or low duty cycle events may be handled in a different way. One such event is an inquiry/page scan (which takes 11 ms every 1.28 or 2.56 seconds). An inquiry/page scan may occur in Bluetooth connected mode. In that situation, some solution (such as power backoff or time division multiplexing (TDM)) is already being applied. Thus, in connected mode an inquiry/page scan will apply the same solution as applied during the Bluetooth connected mode. If the inquiry/page scan occurs when Bluetooth is not in connected mode, the inquiry/page scan may be given priority over any potentially interfering LTE activity. This may result in 0.5-1% throughput loss to LTE. If the inquiry/page scan is given priority over LTE, LTE may either be denied outright or transmitted with an increased or maximum power backoff. The UE may perform the power backoff autonomously to protect the Bluetooth operation, meaning that the UE may not notify the eNB that it is performing power backoff. In one aspect, if LTE is having difficulty transmitting (for example, is attempting a second or later retransmission), then power backoff is not applied and LTE is protected and permitted to operate.

Inquiry/page response is a rare Bluetooth event. For page response, LTE events may be autonomously denied. Inquiry response may be given high priority and LTE is denied. However, after several inquiry response events (for example, the third inquiry response in a 2.56 second period) the priority of inquiry response events may be reduced and LTE permitted to operate. For a Bluetooth sniff event, LTE events may be autonomously denied.

In Band Class 40 (BC40), connection setup events may be handled differently. For inquiry/paging events, frame alignment and an increased timeout may be implemented. Bluetooth transmission may also be denied during LTE downlink transmissions if the Bluetooth transmission power is above a certain threshold. LMP sequence events may be treated opportunistically and prioritized over LTE events, as desired. Specific packets of the LMP sequence (i.e., those near timeout, or packets which, if not allowed, would lead to large connection setup delays) may take priority over LTE and lead to autonomous denial of LTE. For inquiry/page scanning, interlaced scanning may be implemented. For inquiry/page response and Bluetooth sniff events, autonomous denial of LTE may be implemented. As with Band Class 7, for inquiry response, initially Bluetooth may be given high priority and LTE is denied. However, after several inquiry response events (for example, the third inquiry response in a 2.56 second period) the priority of inquiry response events may be reduced and LTE permitted to operate.

In Band Class 40, connection setup events may be handled differently when coexistence issues are being managed between an LTE radio and a WLAN radio. If the WLAN radio is engaged in passive scanning, opportunistic reception of beacons may be implemented. If the WLAN radio is engaged in active scanning, a rare event, a UE may allow probe requests, even if they may cause LTE interference. Otherwise, opportunistic reception may also be used. For authentication and association, for the station, an authentication request may be sent and a CTS (clear to send)-2-Self packet used during LTE uplink transmission to avoid reception by the WLAN radio. For mobile WiFi (e.g., MiFi) operation (in which a device receives LTE signals and operates as an access point for other devices) authentication requests may be opportunistically received, followed by use of CTS-2-Self during LTE uplink transmission to avoid reception by the WLAN radio. Priority may be given to LTE to protect against interference with infrequent WLAN events during idle mode. For example, if WLAN is expecting a beacon reception, LTE may be denied as desired to allow the beacon reception. Alternatively, a TDM gap pattern may be employed to halt LTE communications during certain time periods.

Described above are methods for protecting Bluetooth or WLAN from interference during their sensitive communications. In another aspect, LTE connection setup and handover may be protected from interference from low priority Bluetooth or WLAN events. Specifically, certain Bluetooth and WLAN events may be given priority ranks (ranging from rank 0 for lowest priority to rank 4 for nominal priority to rank 7 for highest priority). Table 1 illustrates a chart of LTE events used during connection setup and handover and priority levels that may be assigned to protect them from lower ranking and potentially interfering events from Bluetooth/WLAN:

TABLE 1

| Event | Priority | Priority at timeout |
|---|---|---|
| Primary Synchronization Signal/Secondary Synchronization Signal (PSS/SSS) Detection (in BC40) | 6 | 7 |
| Physical Broadcast Channel (PBCH) (in BC40) | 6 | 7 |
| System Information Block Type 1 (SIB1): Initial acquisition or after system information change (in BC40) | 6 | 7 |
| SIB (system information block) 1: Connected | 0 | 7 |
| Physical Random Access Channel (PRACH) | 6 | 7 |
| Random Access Response (RAR) | 6 | 7 |
| Random Access Message (MSG3) | 6 | 7 |
| Contention Resolution (in BC40) | 6 | 7 |
| Paging Occasion (PO) (When LTE is in idle mode, RRC_IDLE) | 6 | 7 |

If a potential collision may occur between a listed LTE event and a Bluetooth/WLAN event, Bluetooth/WLAN events with lower priority may either be denied or allowed with a transmit power lower than a certain threshold (to avoid interference with LTE).

In Band 40, after LTE performs synchronization and obtains information about the TDD configuration, if Bluetooth is operating in master mode it may begin frame alignment procedures.

Although examples above illustrate protected connection setup for Bluetooth, the protected connection setup may be for any radio access technology (RAT) available to a user equipment including Long Term Evolution. Examples of potential protected LTE connection setup include inter-frequency measurement, handover event, random access channel (RACH) procedure, receipt of a page opportunity in idle mode, receipt of system information (such as in a system information block (SIB)), and re-acquisition of system information. To protect connection setup, the connection setup may be given a priority higher than the priority of events of conflicting RATs. For example, an LTE connection setup event may be given a higher priority of nominal events of Bluetooth or wireless local area network (WLAN). To protect the connection setup, events of other RATs, in this example Bluetooth or WLAN events, may be denied, or power backoff may be applied to the other RATs to reduce interference to the connection setup.

TDM Patterns to Protect Connection Setup

Time division multiplexing (TDM) techniques may be employed to create gap patterns for radio access technology (RAT) operations. During gap intervals in the TDM pattern for the first RAT, a second RAT may attempt connection setup. Such techniques may be used with LTE and ISM radio access technologies or with other radio access technologies.

A TDM scheme may be provided where LTE is permitted to transmit during a certain period (T_On) and is not permitted to transmit during a certain period (T_Off). The lengths of T_On and T_Off are variable.

During T_On, an ISM radio (such as Bluetooth) may operate opportunistically for inquiry/paging due to potential LTE interference. During T_Off, LTE is not transmitting and the BT radio may receive without coexistence interference.

Figure 11:
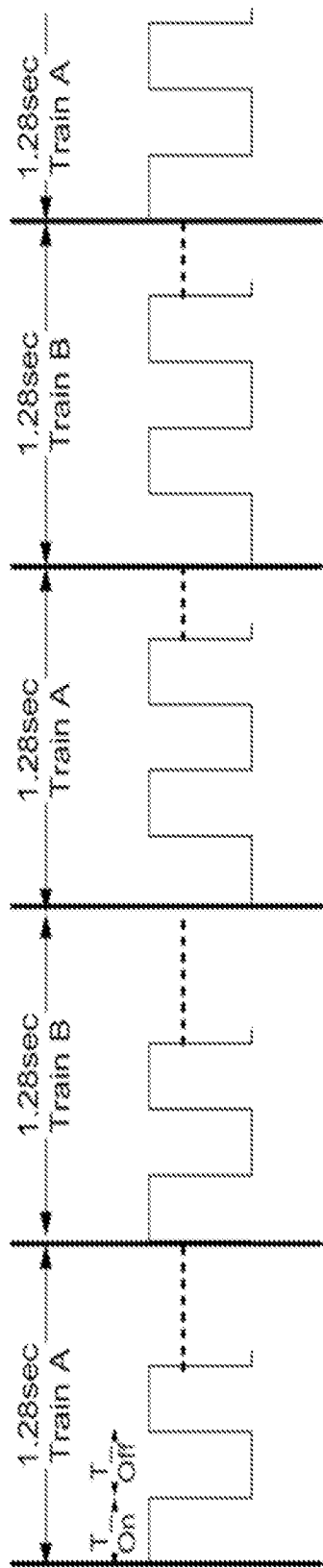
FIG. 11 is a diagram illustrating a time-division multiplexing (TDM) configuration for support of multi-radio coexistence during connection setup according to one aspect of the present disclosure.

Each period T alternates between T_On and T_Off. FIG. 11 shows such a scheme of alternating T_On and T_Off with a period of 1.28 seconds. The TDM configuration may be phase shifted, such as the configuration illustrated in FIG. 11. For the first two periods, the period T begins at T_On and alternates between T_On and T_Off. For the next two periods (beginning at period three), T begins at T_Off and alternates between T_Off and T_On. The pattern then repeats. The gap pattern may be phase shifted when repeating each Bluetooth frequency train (i.e., interval). Example Bluetooth intervals include 1.28 sec for paging and 2.56 sec for inquiry. The phase shift in TDM configuration (where the first and second periods begin T_On but the third and fourth periods begin T_Off) allows a Bluetooth radio listening at the very beginning of the period to listen without LTE interference during certain periods. The value of T_On and T_Off may be adjusted such that the value of T_On and T_Off during a single period is not equal (for example, T_On may be slightly shorter than T_Off in a particular period), however the cumulative time for T_On during the first interval plus the cumulative value of T_On for the third interval should equal one entire period (for example, 1.28 sec). Longer T_On and T_Off periods may reduce leakage from dropped packets.

Figure 12:
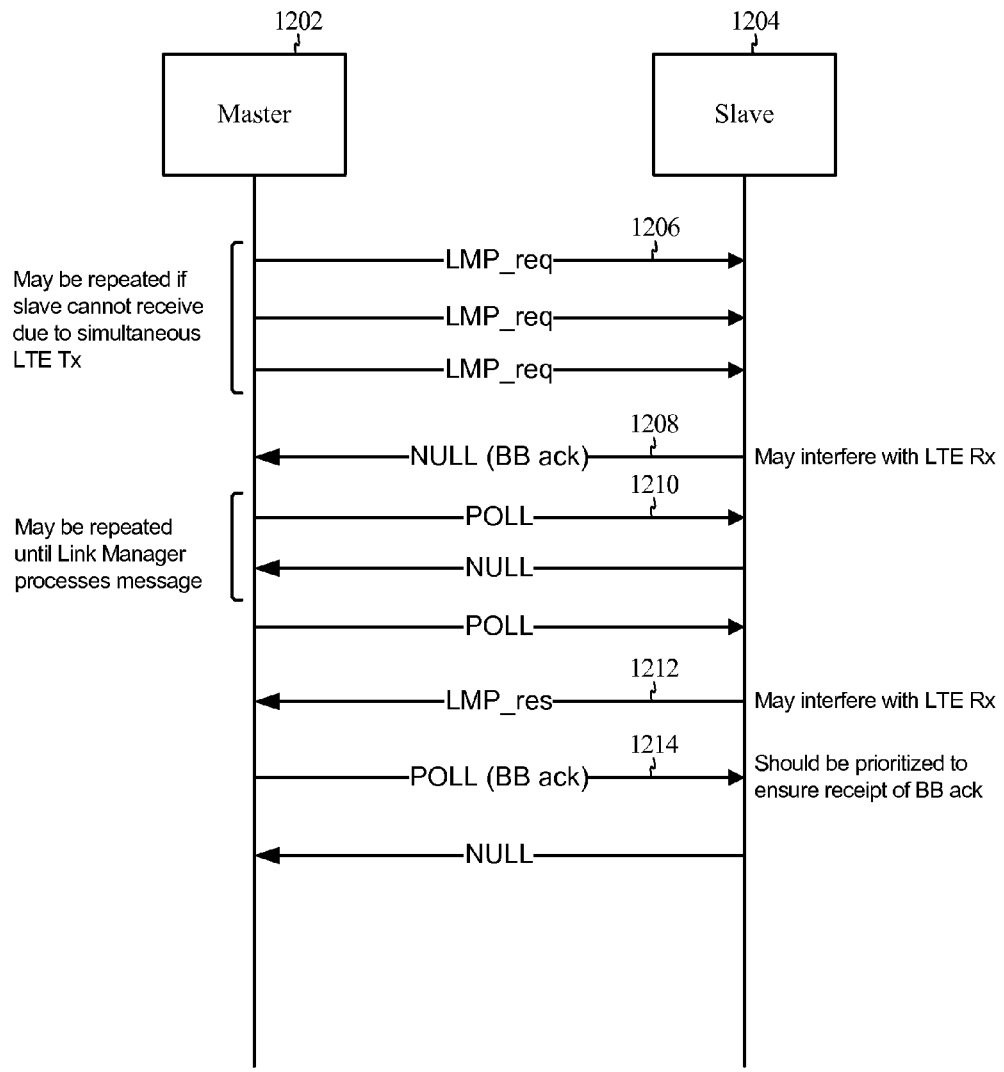
FIG. 12 is a diagram illustrating Bluetooth connection setup according to one aspect of the present disclosure.

FIG. 12 illustrates a call flow diagram during an attempt by a Bluetooth master 1202 to connect to a Bluetooth slave 1204. As illustrated, such connection attempts may be interrupted by, or may cause, interference with an LTE radio. Link Manager Protocol requests (LMP_req) 1206 help initiate the connection process. Such Link Manager Protocol requests may be transmitted from a Bluetooth master to a Bluetooth slave. If the slave is simultaneously attempting to receive (Rx) the Link Manager Protocol request while transmitting (Tx) in LTE, the Link Manager Protocol request may not properly be received. The master 1202 may then continue to send the Link Manager Protocol request multiple times until acknowledged by the slave 1204. If the Link Manager Protocol request is not received, the slave 1204 will send the master 1202 a Null baseband acknowledgment (BB ack) message 1208. Transmitting the Null message by a slave 1204 may interfere with LTE reception of another radio of the slave 1204. The master 1202 may then continue to send Poll messages 1210 to the slave 1204 until the slave 1204 recognizes the Link Manager Protocol request with a Link Manager Protocol response (LMP_res) message 1212. Subsequently, the master 1202 sends a poll baseband acknowledgement 1214 to the slave 1204. The poll baseband acknowledgement should be prioritized to ensure receipt of the acknowledgement. The master and/or slave may implement the above TDM scheme to facilitate these LMP connection attempts.

Table 2 below illustrates TDM pattern configurations for a Link Manager Protocol exchange. Table 2 lists events, the direction of the communication (from Master (M) to Slave (S) or from Slave (S) to Master (M)) of each event, and the priority of the TDM pattern as related to the event.

TABLE 2

| Event | Direction | Priority |
|---|---|---|
| LMP__req (Rx) (request) | Master (M) to Slave (S) | Slave implements TDM pattern right after paging response (LTE on for x1 ms followed by LTE off x2 ms) |
| Null (BB Ack) (Rx) | S to M | Master implements TDM pattern right after paging response (LTE on x1 ms followed by LTE off x2 ms) |
| POLL (Rx) | M to S | Slave implements TDM pattern (LTE on x1 ms followed by LTE off x2 ms) |
| Null (Rx) | S to M | Master implements TDM pattern (LTE on x1 ms followed by LTE off x2 ms) |
| LMP__res (Rx) (response) | S to M | Master implements TDM pattern (LTE on x1 ms followed by LTE off x2 ms) |
| POLL (BB ACK) (Rx) | M to S | Given higher priority over LTE |
| Null (if it carries ACK) (Rx) | S to M | Given higher priority over LTE |

As indicated by Table 2, the TDM pattern of LTE on for a certain period (x1 ms) followed by LTE being off for the next period (x2 ms) may be implemented by the master or slave.

Figure 13:
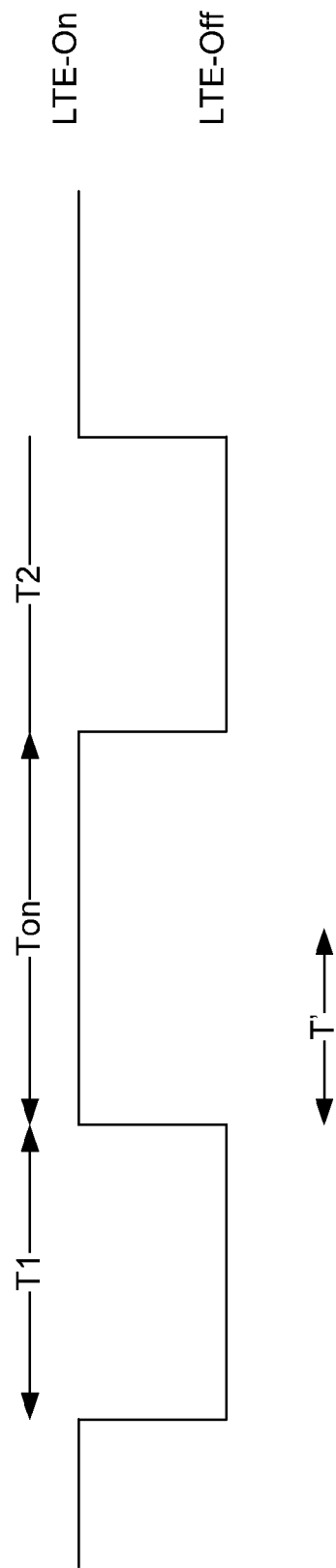
FIG. 13 is a diagram illustrating a time-division multiplexing (TDM) configuration for support of multi-radio coexistence during connection setup according to one aspect of the present disclosure.

A TDM configuration may also be implemented during a WLAN connection setup using passive scanning. An example for a long term TDM pattern is shown in FIG. 13. Shown in FIG. 13 is a TDM pattern with alternating LTE-On (high), and LTE-Off (low) time periods. The TDM pattern may be configured to allow a WLAN radio to complete its connection setup.

In WLAN connection setup, a WLAN radio listens for a beacon from an access point (AP). In order to connect to a WLAN access point, a UE should receive the beacon without interference (for example, from LTE or another RAT). A beacon is repeated at interval T, where T is lower bounded by $T_{min}$ (the shortest period between beacons), and upper bounded by $T_{max}$ (the longest period between beacons), measured in milliseconds (ms). The TDM gap pattern may be coordinated with $T_{max}$ and $T_{min}$ to improve WLAN communications. If the WLAN beacon is not received during a first scan period $T_1$, it may fall into the LTE-On period, and be missed by the WLAN radio due to interference from LTE transmission activity. The earliest time a WLAN beacon could be missed due to LTE interference is at the boundary of LTE-On. The latest time (T') is $T-T_1$.

The TDM configuration may be structured such that T'+T falls completely in the next LTE-Off period, allowing the WLAN beacon to be received without LTE transmit interference. The start of $T_2$ is calculated using the lower bound on T which is $T_{min}$. The end of $T_2$ assumes the upper bound on T which is $T_{max}$. Therefore, the $T_{on}=T_{min}$−Delta, where Delta is a time offset chosen to ensure the WLAN beacon is received in $T_2$ if not received in $T_1$. The time values may be chosen such that $T_2+T_{on}-T'=T_{max}$ and $T_2=T_{max}+T'-T_{on}=2T_{max}-T_1-T_{on}$, or more simply $T_1+T_2=2T_{max}-T_{on}$. Although $T_1$ and $T_2$ need not be equal, selecting $T_1=T_2$ provides for a reduced delay impact on LTE.

Figure 14:
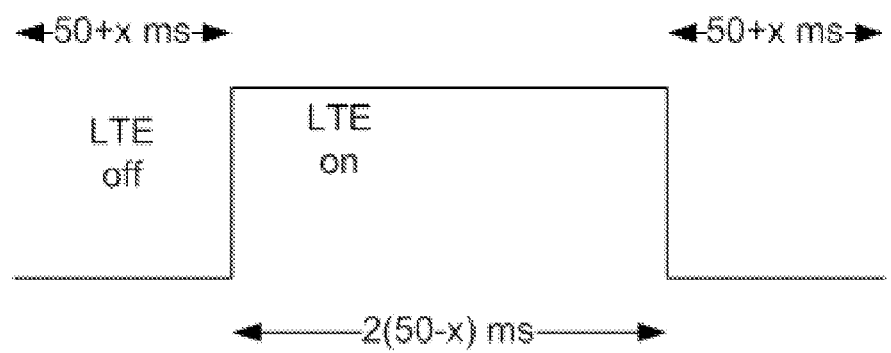
FIG. 14 is a diagram illustrating a time-division multiplexing (TDM) configuration for support of multi-radio coexistence during connection setup according to one aspect of the present disclosure.

A specific example of the TDM configuration described above in reference to WLAN connection setup is shown in FIG. 14. FIG. 14 shows an example of an extended TDM pattern with a period of ~200 ms (with a 50% chance the WLAN beacon is found in the first 50 ms). A coexistence manager may use the communication history to prioritize channel scanning or may start scanning channels with the least likely coexistence issues. If dynamic frequency selection (DFS) is supported, the UE may report to the access point (AP) the channel most likely to avoid coexistence interference.

Figure 15:
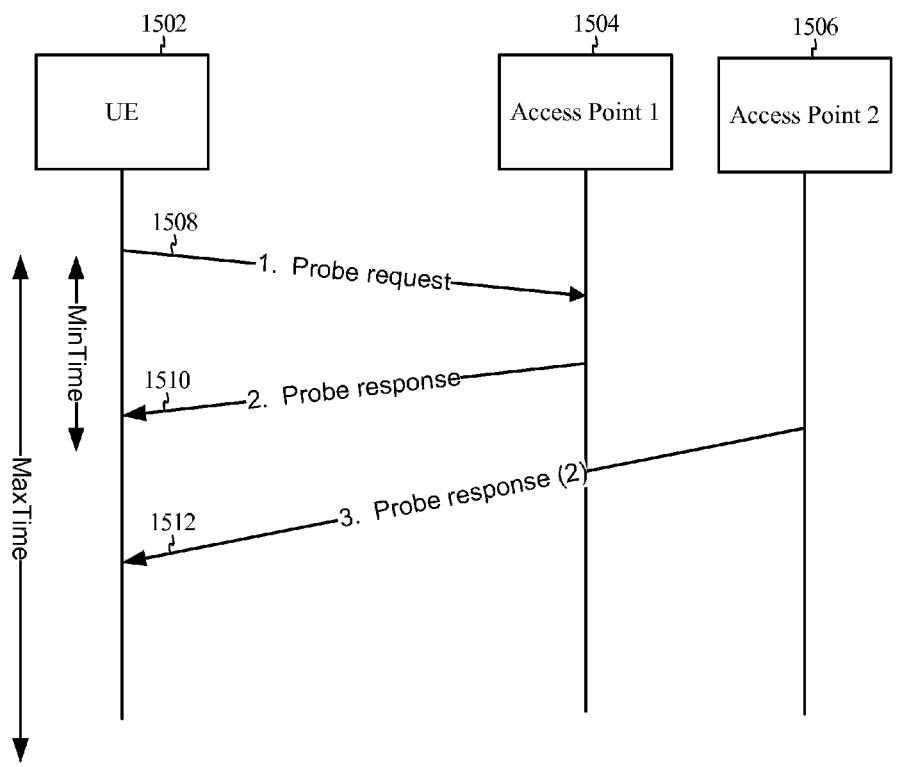
FIG. 15 is a diagram illustrating WLAN connection setup according to one aspect of the present disclosure.

Other techniques may be employed when coordinating WLAN connection setup using active scanning. FIG. 15 shows an example call flow diagram illustrating communications between a WLAN station (noted as UE 1502) and two access points (Access Point 1 1504 and Access Point 2 1506) during WLAN connection setup using active scanning and performing shared key authentication. A TDM scheme as shown above may be employed, with the various T times adjusted. First the UE 1502 may gain access to the channel with a wireless scan mode using a distributed coordination function (DCF) after ProbeDelay timer. The UE 1502 may send a probe request 1508 to connect to either Access Point 1504, 1506. The UE 1502 listens for a certain time, illustrated as MinTime. If no response is received, the UE 1502 may move to a different channel. If a channel is busy, the UE 1502 waits for a certain set time, illustrated as MaxTime. If a probe response 1510 or 1512 is received it is processed by the UE 1502 and connection setup may proceed. If the medium is busy the UE 1502 may start an LTE gap at MinTime and extend to MaxTime. The CxM may notify the WLAN radio to send a probe request during the LTE off gap period to reduce interference. When the UE 1502 is operating a an access point using LTE as the back haul (e.g., MiFi) the probe request may be sent opportunistically during uplink transmission times to reduce interference.

For WLAN authentication/association, in Band 7 LTE power backoff may be employed to quiet LTE. An extended TDM scheme (for example 30 ms on/off period) may also be employed for Band 7 or Band 40 communications.

Figure 16:
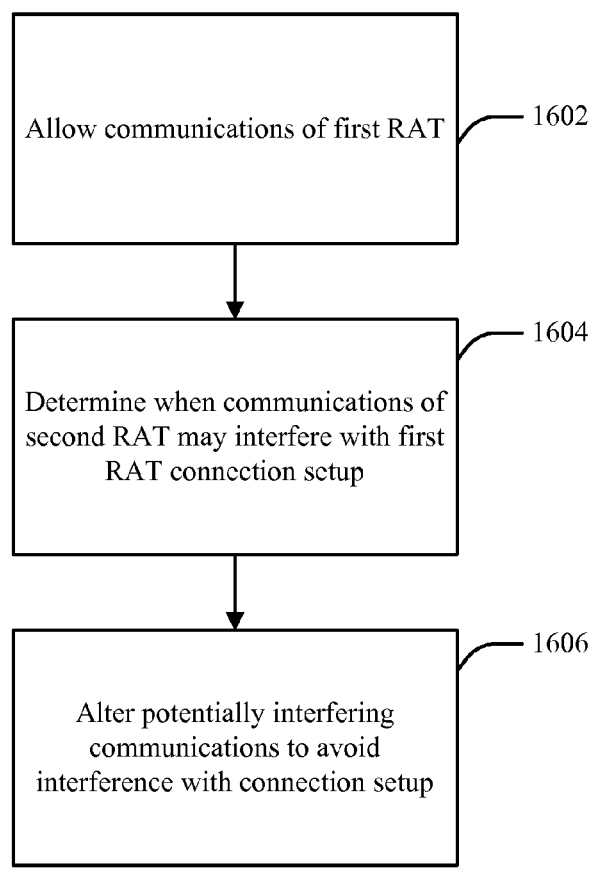
FIG. 16 is a block diagram illustrating support for multi-radio coexistence during connection setup according to one aspect of the present disclosure.

As shown in FIG. 16 a UE may allow communications using a first RAT, as shown in block 1602. The UE may determine when communications of a second RAT may potentially interfere with connection setup of the first RAT, as shown in block 1604. The UE may then altering potentially interfering communications of the first RAT or second RAT to avoid interference with the at least one connection setup of the first RAT, as shown in block 1606.

Figure 17:
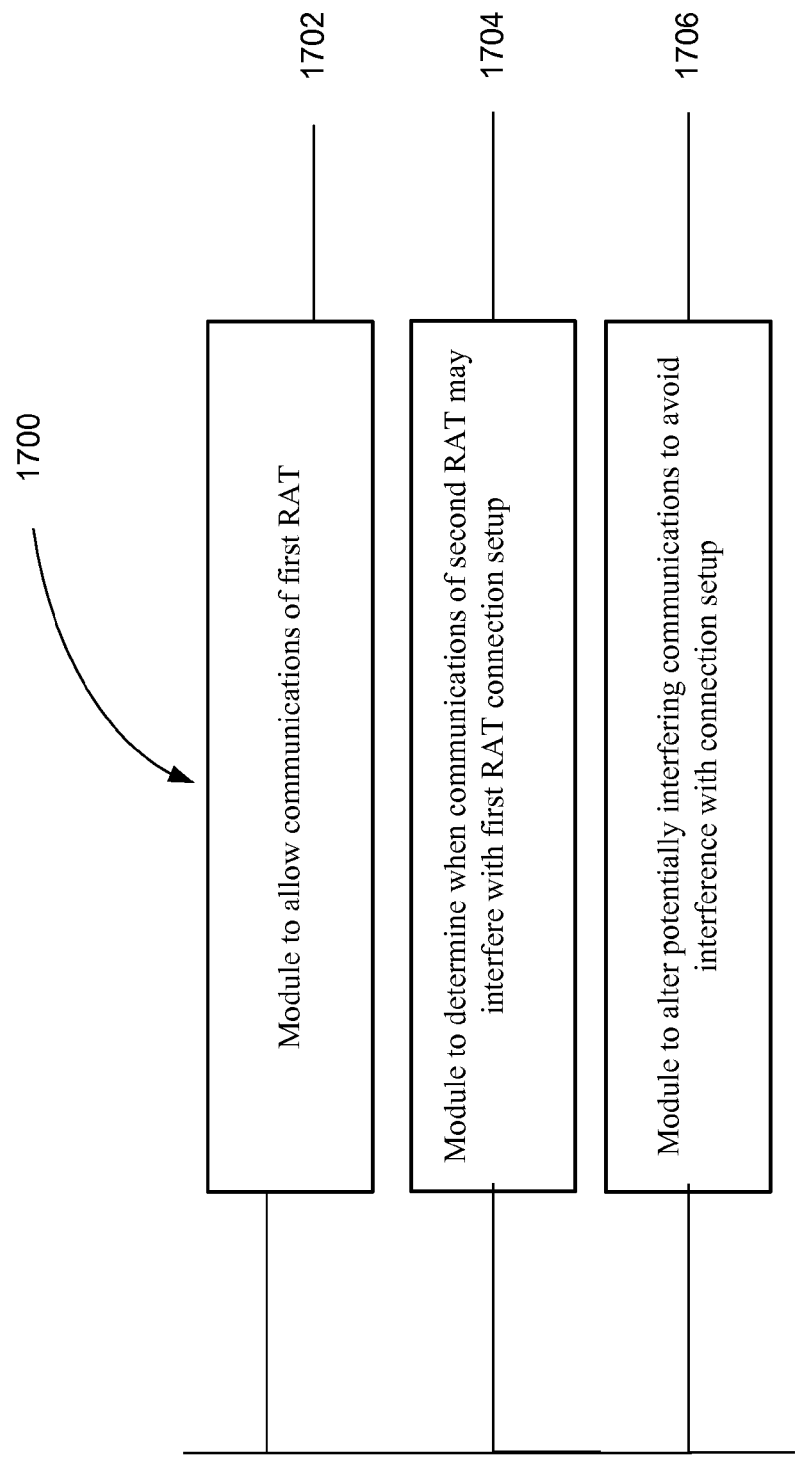
FIG. 17 is a block diagram illustrating components for support for multi-radio coexistence during connection setup according to one aspect of the present disclosure.

FIG. 17 shows a design of an apparatus 1700 for a UE. The apparatus 1700 includes a module 1702 to allow communications using a first RAT. The apparatus also includes a module 1704 to determine when communications of a second RAT may potentially interfere with connection setup of the first RAT. The apparatus also includes a module 1706 to alter potentially interfering communications of the first RAT or second RAT to avoid interference with the at least one connection setup of the first RAT. The modules in FIG. 17 may be processors, electronics devices, hardware devices, electronics components, logical circuits, memories, software codes, firmware codes, etc., or any combination thereof.

A UE may comprise means for allowing communications, means for determining when communications potentially interfere with connection setup, and means for altering potentially interfering communications. In one aspect, the aforementioned means may be the processor 270, memory 272, coexistence manager 640, channel monitoring module 1012, connection setup analyzer 1014, TDM determination module 1016, module 1702, module 1704, and/or module 1706 configured to perform the functions recited by the aforementioned means. In another aspect, the aforementioned means may be a module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
    allowing communications using a first radio access technology (RAT) of a user equipment;
    commencing a first connection setup procedure of the first RAT;
    estimating a signal quality of the first RAT during the first connection setup procedure while a second RAT of the user equipment is transmitting;
    estimating a signal quality of the first RAT while the second RAT is not transmitting;
    comparing the estimated signal quality of the first RAT during the first connection setup procedure while the second RAT is transmitting to the estimated signal quality of the first RAT while the second RAT is not transmitting;
    determining when communications of a second RAT may potentially interfere with at least one future connection setup of the first RAT based at least in part on a result of the comparing; and
    altering potentially interfering communications of the first RAT or second RAT to avoid interference with the at least one future connection setup of the first RAT.

2. The method of claim 1 in which the altering potentially interfering communications comprises:
    constructing a first time-division multiplexed (TDM) gap pattern, the first gap pattern comprising equal length periods alternating between first allowing active communications on the second RAT and then prohibiting active communications on the second RAT;
    constructing a second TDM gap pattern, the second gap pattern comprising equal length periods alternating between first prohibiting active communications on the second RAT and then allowing active communications on the second RAT;
    applying the first TDM gap pattern during a first interval;
    applying the second TDM gap pattern during a subsequent interval; and during the first interval or subsequent interval, attempting connection setup on the first RAT during a period where active communications on the second RAT are prohibited.

3. The method of claim 2 in which a cumulative time given to periods allowing active communications on the second RAT during the first interval and second interval equals a length of the first interval.

4. The method of claim 2 in which the first RAT comprises Bluetooth and the second RAT comprises Long Term Evolution (LTE).

5. The method of claim 2 in which a length of periods allowing active communications on the second RAT during the first interval is greater than a length of periods prohibiting active communications on the second RAT.

6. The method of claim 2 in which a length of periods prohibiting active communications on the second RAT during the first interval is greater than a length of periods allowing active communications on the second RAT.

7. The method of claim 1 in which the at least one future connection setup is a Bluetooth paging event and the altering the potentially interfering communications comprises executing LTE power backoff.

8. The method of claim 1 in which the at least one future connection setup is a Bluetooth inquiry event and the altering the potentially interfering communications comprises executing LTE power backoff for periodic Bluetooth inquiry events.

9. The method of claim 8 further comprising, after two inquiry responses within a predetermined duration, denying subsequent Bluetooth inquiry responses and allowing the potentially interfering communications.

10. The method of claim 1 in which the at least one future connection setup is a Bluetooth link management protocol communication for Bluetooth operating in slave mode and the altering the potentially interfering communications comprises executing LTE power backoff and PUCCH puncturing.

11. The method of claim 1 in which the at least one future connection setup is a Bluetooth link management protocol communication for Bluetooth operating in master mode and the altering the potentially interfering communications comprises altering the potentially interfering communications in a same manner as for a previous Bluetooth paging event.

12. The method of claim 1 in which the at least one future connection setup is one of a Bluetooth page response and Bluetooth sniff event and the altering the potentially interfering communications comprises denying the potentially interfering communications.

13. The method of claim 1 in which the at least one future connection setup is a Bluetooth inquiry response and the altering the potentially interfering communications comprises prioritizing the Bluetooth inquiry response and denying the potentially interfering communications.

14. The method of claim 1 in which the at least one future connection setup is one of passive scanning and receipt of a beacon during idle mode by a wireless local area network (WLAN) radio and the altering the potentially interfering communications comprises opportunistically denying the potentially interfering communications to allow the WLAN radio to receive beacons.

15. The method of claim 1 in which the at least one future connection setup is operation in station mode by a WLAN radio and the altering the potentially interfering communications comprises, by the WLAN radio, sending an authentication request and employing CTS-2-Self to avoid reception during LTE uplink transmission.

16. The method of claim 1 in which the at least one future connection setup is MiFi operation by a WLAN radio and the altering the potentially interfering communications comprises, by the WLAN radio, receiving an authentication request and employing CTS-2-Self to avoid reception during LTE uplink transmission.

17. The method of claim 1 in which the altering the potentially interfering communications comprises assigning a first priority to an LTE connection setup event, the first priority being higher than a second priority of nominal events of Bluetooth or wireless local area network (WLAN).

18. The method of claim 17 in which the LTE connection setup event comprises at least one of the following: inter-frequency measurement, handover event, random access channel (RACH) procedure, receipt of a page opportunity in idle mode, receipt of system information, and re-acquisition of system information.

19. The method of claim 17 in which the altering potentially interfering communications comprises at least one of: denying a Bluetooth or WLAN event and applying power backoff to a Bluetooth or WLAN RAT.

20. The method of claim 1 in which the altering potentially interfering communications comprises:
    allowing connection attempts on the first RAT during a first time period and a third time period;
    allowing active communications on the second RAT during a second time period; and
    alternating between the first, second, and third time periods, in which a length of the second time period is configured to allow a connection setup message on the first RAT to be received during the first or third time period.

21. The method of claim 20 in which the first time period and third time period are of equal length.

22. The method of claim 20 in which the connection setup message is a periodic wireless local area network (WLAN) beacon.

23. The method of claim 22 in which the second time period is configured to have a length between a shortest possible period between WLAN beacons and a longest possible period between WLAN beacons.

24. An apparatus for wireless communications, comprising:
    means for allowing communications using a first radio access technology (RAT) of the apparatus;
    means for commencing a first connection setup procedure of the first RAT;
    means for estimating a signal quality of the first RAT during the first connection setup procedure while a second RAT of the apparatus is transmitting;
    means for estimating a signal quality of the first RAT while the second RAT is not transmitting;
    means for comparing the estimated signal quality of the first RAT during the first connection setup procedure while the second RAT is transmitting to the estimated signal quality of the first RAT while the second RAT is not transmitting;
    means for determining when communications of a second RAT may potentially interfere with at least one future connection setup of the first RAT based at least in part on a result of the comparing; and
    means for altering potentially interfering communications of the first RAT or second RAT to avoid interference with the at least one future connection setup of the first RAT.

25. A computer program product for wireless communications, the computer program product comprising:

a non-transitory computer-readable medium having program code recorded thereon, the program code comprising:
program code to allow communications using a first radio access technology (RAT) of a user equipment;
program code to commence a first connection setup procedure of the first RAT;
program code to estimate a signal quality of the first RAT during the first connection setup procedure while a second RAT of the user equipment is transmitting;
program code to estimate a signal quality of the first RAT while the second RAT is not transmitting;
program code to compare the estimated signal quality of the first RAT during the first connection setup procedure while the second RAT is transmitting to the estimated signal quality of the first RAT while the second RAT is not transmitting;
program code to determine when communications of a second RAT may potentially interfere with at least one future connection setup of the first RAT based at least in part on a result of the comparison; and
program code to alter potentially interfering communications of the first RAT or second RAT to avoid interference with the at least one future connection setup of the first RAT.

26. An apparatus for wireless communications, comprising:
a memory; and
at least one processor coupled to the memory, the at least one processor being configured:
to allow communications using a first radio access technology (RAT) of the apparatus;
to commence a first connection setup procedure of the first RAT;
to estimate a signal quality of the first RAT during the first connection setup procedure while a second RAT of the apparatus is transmitting;
to estimate a signal quality of the first RAT while the second RAT is not transmitting;
to compare the estimated signal quality of the first RAT during the first connection setup procedure while the second RAT is transmitting to the estimated signal quality of the first RAT while the second RAT is not transmitting;
to determine when communications of a second RAT may potentially interfere with at least one future connection setup of the first RAT based at least in part on a result of the comparison; and
to alter potentially interfering communications of the first RAT or second RAT to avoid interference with the at least one future connection setup of the first RAT.

27. The apparatus of claim 26 in which the at least one processor configured to alter potentially interfering communications comprises the at least one processor configured to:
construct a first time-division multiplexed (TDM) gap pattern, the first gap pattern comprising equal length periods alternating between first allowing active communications on the second RAT and then prohibiting active communications on the second RAT;
construct a second TDM gap pattern, the second gap pattern comprising equal length periods alternating between first prohibiting active communications on the second RAT and then allowing active communications on the second RAT;
apply the first TDM gap pattern during a first interval;
apply the second TDM gap pattern during a subsequent interval; and
during the first interval or subsequent interval, attempt connection setup on the first RAT during a period where active communications on the second RAT are prohibited.

28. The apparatus of claim 27 in which a cumulative time given to periods allowing active communications on the second RAT during the first interval and second interval equals a length of the first interval.

29. The apparatus of claim 27 in which the first RAT comprises Bluetooth and the second RAT comprises Long Term Evolution (LTE).

30. The apparatus of claim 27 in which a length of periods allowing active communications on the second RAT during the first interval is greater than a length of periods prohibiting active communications on the second RAT.

31. The apparatus of claim 27 in which a length of periods prohibiting active communications on the second RAT during the first interval is greater than a length of periods allowing active communications on the second RAT.

32. The apparatus of claim 26 in which the at least one future connection setup is a Bluetooth paging event and the at least one processor is configured to alter the potentially interfering communications comprises executing LTE power backoff.

33. The apparatus of claim 26 in which the at least one future connection setup is a Bluetooth inquiry event and the at least one processor is configured to alter the potentially interfering communications comprises executing LTE power backoff for periodic Bluetooth inquiry events.

34. The apparatus of claim 33 in which the at least one processor is further configured to, after two inquiry responses within a predetermined duration, deny subsequent Bluetooth inquiry responses and allow the potentially interfering communications.

35. The apparatus of claim 26 in which the at least one future connection setup is a Bluetooth link management protocol communication for Bluetooth operating in slave mode and the at least one processor is configured to execute LTE power backoff and PUCCH puncturing.

36. The apparatus of claim 26 in which the at least one future connection setup is a Bluetooth link management protocol communication for Bluetooth operating in master mode and the at least one processor is configured to alter the potentially interfering communications in a same manner as for a previous Bluetooth paging event.

37. The apparatus of claim 26 in which the at least one future connection setup is one of a Bluetooth page response and Bluetooth sniff event and the at least one processor is configured to deny the potentially interfering communications.

38. The apparatus of claim 26 in which the at least one future connection setup is a Bluetooth inquiry response and the at least one processor is configured to prioritize the Bluetooth inquiry response and deny the potentially interfering communications.

39. The apparatus of claim 26 in which the at least one future connection setup is one of passive scanning and receipt of a beacon during idle mode by a wireless local area network (WLAN) radio and the at least one processor is configured to opportunistically deny the potentially interfering communications to allow the WLAN radio to receive beacons.

40. The apparatus of claim 26 in which the at least one future connection setup is operation in station mode by a WLAN radio and the at least one processor is configured to, by the WLAN radio, send an authentication request and employ CTS-2-Self to avoid reception during LTE uplink transmission.

41. The apparatus of claim 26 in which the at least one future connection setup is MiFi operation by a WLAN radio and the at least one processor is configured to, by the WLAN radio, receive an authentication request and employ CTS-2-Self to avoid reception during LTE uplink transmission.

42. The apparatus of claim 26 in which the at least one processor is configured to assign a first priority to an LTE connection setup event, the first priority being higher than a second priority of nominal events of Bluetooth or wireless local area network (WLAN).

43. The apparatus of claim 42 in which the LTE connection setup event comprises at least one of the following: inter-frequency measurement, handover event, random access channel (RACH) procedure, receipt of a page opportunity in idle mode, receipt of system information, and re-acquisition of system information.

44. The apparatus of claim 42 in which the at least one processor is configured to alter potentially interfering communications by at least one of: denying a Bluetooth or WLAN event and applying power backoff to a Bluetooth or WLAN RAT.

45. The apparatus of claim 26 the at least one processor is configured to alter potentially interfering communications by:
    allowing connection attempts on the first RAT during a first time period and a third time period;
    allowing active communications on the second RAT during a second time period; and
    alternating between the first, second, and third time periods, in which a length of the second time period is configured to allow a connection setup message on the second RAT to be received during the first or third time period.

46. The apparatus of claim 45 in which the first time period and third time period are of equal length.

47. The apparatus of claim 45 in which the connection setup message is a periodic wireless local area network (WLAN) beacon.

48. The apparatus of claim 47 in which the second time period is configured to have a length between a shortest possible period between WLAN beacons and a longest possible period between WLAN beacons.

\* \* \* \* \*